United States Patent [19]

Kato

[11] Patent Number: 5,335,549
[45] Date of Patent: Aug. 9, 1994

[54] SEMICONDUCTOR PRESSURE SENSOR HAVING DOUBLE DIAPHRAGM STRUCTURE

[75] Inventor: Kazuyuki Kato, Kanagawa, Japan

[73] Assignee: Fuji Electric Co., Ltd., Kanagawa, Japan

[21] Appl. No.: 982,655

[22] Filed: Nov. 27, 1992

[30] Foreign Application Priority Data

Nov. 29, 1991 [JP] Japan ................................. 3-315694

[51] Int. Cl.$^5$ .............................................. G01L 7/00
[52] U.S. Cl. ................................. 73/706; 73/721
[58] Field of Search ............... 73/706, 756, 720, 721, 73/726, 727, 708; 338/3, 4, 42

[56] References Cited

U.S. PATENT DOCUMENTS

| | | | |
|---|---|---|---|
| 4,276,533 | 1/1981 | Tominaga et al. | 73/727 |
| 4,287,501 | 9/1981 | Tominaga et al. | 73/720 |
| 4,309,908 | 1/1982 | Rapp et al. | 73/720 |
| 4,576,052 | 3/1986 | Sugiyama | 73/727 |
| 4,665,754 | 5/1987 | Glenn et al. | 73/727 |
| 4,944,187 | 7/1990 | Frick et al. | 73/726 |

FOREIGN PATENT DOCUMENTS

| | | |
|---|---|---|
| 0115074A3 | 8/1984 | European Pat. Off. |
| 0135653A3 | 4/1985 | European Pat. Off. |
| 0278341A2 | 8/1988 | European Pat. Off. |
| 4118824 | 12/1991 | Fed. Rep. of Germany |
| 4139147 | 6/1992 | Fed. Rep. of Germany |
| 0103440 | 8/1980 | Japan ................... 73/726 |
| 0290932 | 11/1988 | Japan ................... 73/726 |
| 0262032 | 10/1990 | Japan ................... 73/726 |
| WO86/02446 | 4/1986 | World Int. Prop. O. |

OTHER PUBLICATIONS

European Search Report dated May 14, 1993.
K. J. Korane, "Silicon for High-Pressure Sensing", *Machine Design*, May 11, 1989, pp. 64–70.
P. W. Fry, "Series 2000: Taking the Cost Out of the Industrial Pressure Transducer", *Sensors and Actuators*, May 1991, Nos. 1–3, pp. 845–851.
L. Kirberich, "Innovative Druckmesstechnik mit Keramiktechnologie für industrielle Druck–und Differenzdruck–messaufgaben", *Messen Prufen Automatisieren*, Apr. 1991, No. 4, pp. 160–164.

*Primary Examiner*—Richard E. Chilcot, Jr.
*Assistant Examiner*—William L. Oen
*Attorney, Agent, or Firm*—Finnegan, Henderson Farabow, Garrett & Dunner

[57] ABSTRACT

In a semiconductor sensor having double diaphragm structure, in which pressure to be measured is applied to diaphragm portions having distortion gages via a liquid filled in spaces partitioned by sealed diaphragms, as circuit elements of a signal processing circuit for processing an output of a distortion gage bridge are integrated in and on a semiconductor chip having diaphragm portions, the number of component parts used is reduced, and a compact size, a low cost, and high reliability are attained. This arrangement can be applied to any of the pressure sensors for detecting absolute pressure, relative pressure, and differential pressure.

3 Claims, 3 Drawing Sheets

SEMICONDUCTOR PRESSURE SENSOR HAVING DOUBLE DIAPHRAGM STRUCTURE

BACKGROUND OF THE INVENTION

1. Field of the Invention

The present invention relates to a double diaphragm-type semiconductor pressure sensor adopting a double diaphragm structure to ensure that a fluid whose pressure is to be measured does not come into direct contact with a semiconductor diaphragm on Which a distortion gauge is formed.

2. Description of the Conventional Art

In cases where a semiconductor pressure sensor is used for measurement of pressure of a liquid, such as water pressure and oil pressure, or a mixture thereof, a double diaphragm structure in which a metallic sealed diaphragm is attached to a pressure introducing portion is generally used to avoid the deterioration of the characteristic through the adherence of sediments of the liquid on a semiconductor diaphragm on which a distortion gage is formed. An example of a semiconductor pressure sensor to which this double diaphragm structure is applied is shown in FIG. 2A. In a silicon chip 1, a diaphragm is formed in a central portion thereof by means of etching, and four distortion gages are formed on the diaphragm in a dispersed manner and constitute a bridge circuit. This silicon chip is secured to a container 3 via a pedestal 2 formed of silicon or glass for alleviating a thermal stress. As shown in FIG. 2B, a space 100 surrounded by the pedestal 2 and a recessed portion located in a surface of the diaphragm of the silicon chip 1 is sealed into a vacuum. An upper opening of the container 3 is closed by a sealed diaphragm 4 which is made of stainless steel and whose periphery is airtightly coupled with the container 3, and an insulating oil 5 such as silicone oil is sealed in the interior of a space including the silicon chip 1 and the pedestal 2. A cover 6 airtightly coupled with the periphery of the container 3 is opposed to a top of the sealed diaphragm 4, and a space surrounded by the cover 6 and the sealed diaphragm 4 communicates with the outside via a hole 7 in the cover 6. Input/output voltages to and from the distortion gage bridge are led to outside the container 3 via wires 8 and leads 9 and are connected to the wires of a circuit board 40. An operational amplifier chip 41, a thick-film resistor 42, and the like are mounted on the circuit board 40, thereby constituting a signal processing circuit for amplifying a gage bridge output signal and effecting the compensation of the temperature and adjustment of the characteristic. An output from this circuit is led out to the outside through a lead 10. A major portion of the container 3 and the circuit board 40 are covered with a molded resin 43 for protection.

Pressure to be measured passes through the hole 7 of the cover 6 and is imparted to the sealed diaphragm 4, and is further transmitted to the diaphragm on the silicon chip 1 via the insulating oil 5: Then, as shown in an equivalent circuit in FIG. 3, the bridge constituted by resistors $R_{G1}$, $R_{G2}$, $R_{G3}$, and $R_{G4}$ of the distortion gages produces a difference between a vacuum and a space in the recessed portion of the chip 1, i.e., an output corresponding to an absolute pressure. This output is converted to a sensor signal having a predetermined characteristic and is outputted from a $V_{out}$ terminal. Accordingly, it is necessary to lead out four terminals, namely, a terminal 91 for applying a supply voltage $V_{cc}$ through the container 3, a ground terminal 92 for connecting the chip to Gnd, and two terminals 93 and 94 connected to the signal processing circuit 44.

FIG. 4 is another example of the conventional art, and portions which are common to those of FIG. 2 are denoted by the same reference numerals. In this case, the pressure to be measured is applied to an etched-side surface of the diaphragm. The silicon chip 1 is secured on the pedestal 2 where a hole 11 for introducing the pressure to a central portion is located. In addition, the pedestal 2 is secured on a substrate 12 coupled with the container 3. A hole 13 for introducing the pressure to an extension of the hole 11 in the pedestal 2 is provided in this substrate 12 as well. The insulating oil 5 is sealed in a space surrounded by the silicon chip 1, the substrate 12, the cylindrical container 3, and the sealed diaphragm 4 whose periphery is airtightly coupled with the container 3. The pressure to be measured is introduced through the hole 7 formed in the cover 6, and is transmitted to the etched surface of the diaphragm of the silicon chip 1 via the insulating oil 5. An unetched surface of the silicon chip 1 is covered with a cover 14, and is open to the atmosphere through a hole 15 formed in the cover 14. As a result, this sensor operates as a relative pressure sensor. In the same as the example of the conventional art shown in FIG. 2, the circuit substrate 40 for outputting a predetermined sensor signal by performing signal processing as well as the molded resin 43 for protection are attached to the outside of the container 3.

To disseminate the above-described double diaphragm-type semiconductor pressure sensors, it is necessary to make the sensors compact in size and effect a cost reduction. For the compact size and reduced cost, a reduction of the number of components parts used is effective.

SUMMARY OF THE INVENTION

An object of the present invention is to provide a double diaphragm-type semiconductor pressure sensor having a small number of components used in the light of the above-described circumstances.

To attain the above-described object, the present invention provides a semiconductor pressure sensor in which distortion gages constituting a bridge are provided in a diaphragm portion produced by forming a recessed portion in a surface of a semiconductor chip, a liquid is filled in a closed space existing between the surface of the diaphragm portion and a sealed diaphragm whose periphery is airtightly coupled with a container for accommodating the semiconductor chip, and an output of a distortion gage bridge which is produced as a surface of the sealed diaphragm disposed away from a semiconductor chip side thereof is opposed to a container cover having a hole for introducing pressure is converted to an output signal by a signal processing circuit, characterized in that circuit elements constituting the signal processing circuit are provided in the semiconductor chip and on a surface thereof, and three terminals, including an output terminal lead from the signal processing circuit, a terminal for applying a supply voltage, and a terminal for grounding the semiconductor chip, penetrate the container. To be effective, the space closed by being surrounded by the recessed portion of the semiconductor chip and the container is a vacuum, and the pressure which is introduced to a surface of the sealed diaphragm disposed away from the liquid-side surface thereof is the pressure to be measured. In addition, to be effective, the semiconductor chip is secured on a substrate which has a hole communicating with the recessed portion thereof and which is airtightly coupled with the container, the sealed diaphragm is opposed to a side of the substrate disposed away from a semiconductor chip side thereof, the pressure which is introduced to a surface of the sealed diaphragm disposed away from the liquid-side surface thereof is the pressure to be measured, and the semiconductor chip is opposed to another container cover having a hole for introducing pressure different from the pressure to be measure on sides of the substrate and the semiconductor chip which are located away from sealed diaphragm-sides thereof. Alternatively, the semiconductor chip is secured on a substrate which has a hole communicating with the recessed portion thereof and which is airtightly coupled with the container, a first sealed diaphragm is opposed to a side of the substrate disposed away from a semiconductor chip side thereof, a second sealed diaphragm is opposed to sides of the substrate and the semiconductor chip which are located away from first sealed diaphragm-sides thereof, and surfaces of the first and second sealed diaphragms located away from liquid-side surfaces thereof are respectively opposed to container covers having holes for introducing the pressure to be measured and pressure different from the same, respectively, thicknesses and areas of the first and second sealed diaphragms being equal, the liquids filled in spaces respectively contiguous thereto being identical, and volumes of the respective spaces being equal.

As all the functions of the sensor, i.e., distortion gages and circuit elements of the signal processing circuit are integrated on one silicon chip, it is possible to omit a circuit board disposed outside the container and a mold resin for protecting the circuit board without impairing the sensor function. Furthermore, only a supply input terminal, a signal output terminal, and a ground terminal which are a necessary minimum are used as the terminals penetrating the container, it is possible to realize a compact double diaphragm-type semiconductor pressure sensor with a simple structure. In addition, it is possible to improve the reliability by reducing the number of components parts used.

BRIEF DESCRIPTION OF THE DRAWINGS

FIGS. 1A and 1B show a silicon chip used in the embodiments of the present invention, in which FIG. 1A is a plan view, and FIG. 1B a cross-sectional view;

FIGS. 5A and 5B show an absolute-pressure detecting pressure sensor in accordance with an embodiment of the present invention, in which FIG. 5A is a cross-sectional view, and FIG. 5B a bottom view;

DESCRIPTION OF THE PREFERRED EMBODIMENTS

Figure 1A:
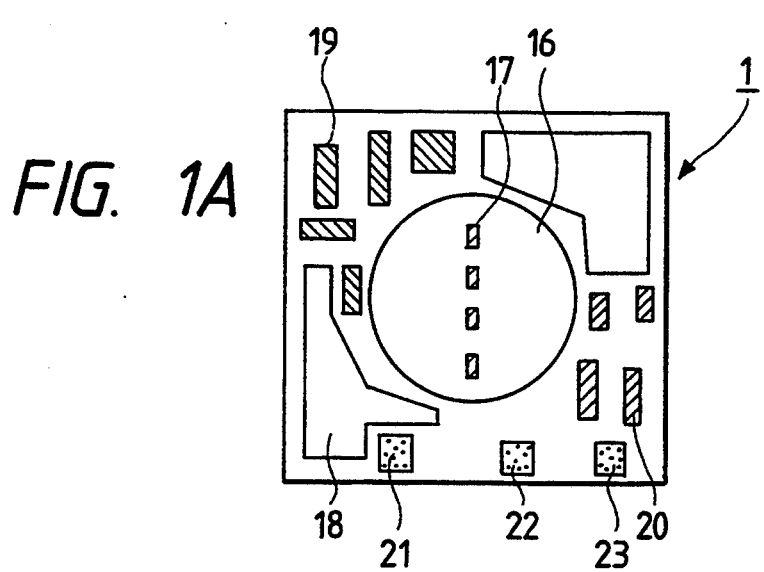
Figure 1B:
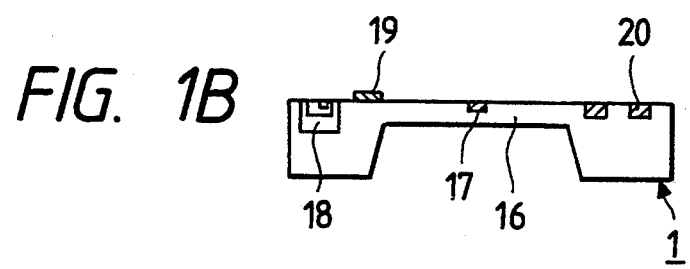
Figure 3:
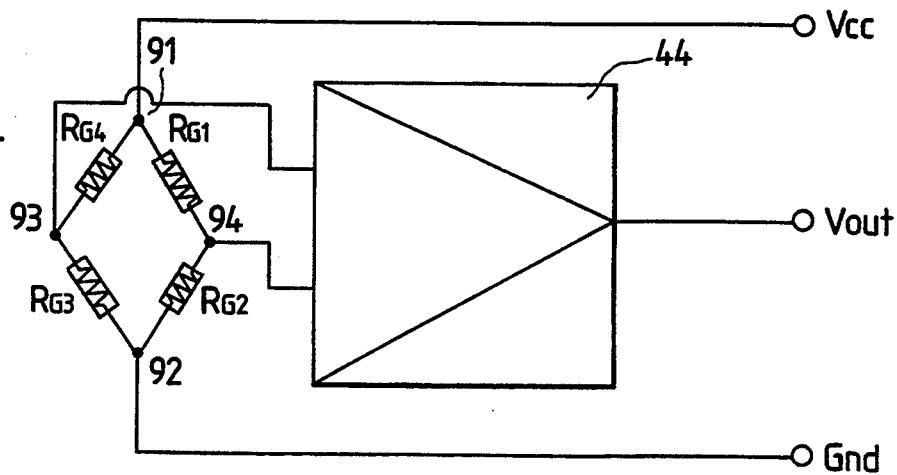
FIG. 3 is an equivalent circuit diagram of the sensor shown in FIG. 2A.

FIGS. 1A and 1B show a silicon chip used in the double diaphragm-type semiconductor pressure sensor in accordance with the embodiments of the present invention, in which FIG. 1A is a plan view, while FIG. 1B is a cross-sectional view. A diaphragm portion 16 is formed in a central portion of a silicon chip 1 by means of etching. Distortion gages 17 are arranged on this surface in a dispersed manner through a diffusion process. A signal processing circuit is formed in a surrounding portion of the silicon chip by means of an IC process. A circuit element 18 is an operational amplifier. Reference numeral 19 denotes a thin-film resistor, and a resistance value thereof can be adjusted by laser trimming or the like. Numeral 20 denotes a diffused resistor, which has a large positive temperature dependence and is used in the circuit for compensation of the temperature characteristic. The distortion gages 17 are arranged as a bridge in the same way of the embodiment of the conventional art shown in FIG. 3, and is driven by the supply voltage $V_{cc}$. The positions of the distortion gages are determined in such a manner that an operational output voltage is produced when pressure is applied to the diaphragm portion 16. The operational output voltage of the bridge is subjected to amplification, compensation of the temperature characteristic, and adjustment of the characteristic by the signal processing circuit, and is converted to a predetermined sensor output signal before it is outputted. The supply of the supply voltage, connection to a ground potential, and output of the sensor signal are effected by means of aluminum wires connected to three aluminum pads 21, 22, and 23 provided on the surface of the silicon chip 1.

Figure 2A:
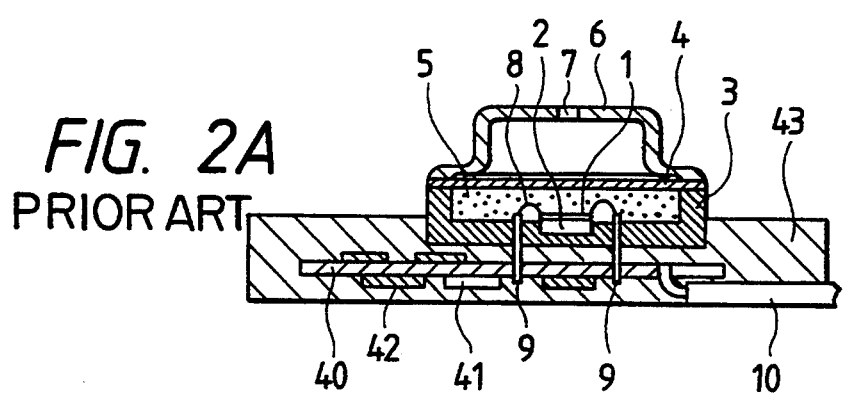
FIG. 2A is a cross-sectional view of a conventional absolute-pressure detecting pressure sensor and FIG. 2B is an enlarged view of the silicon chip and the pedestal.
Figure 2B:
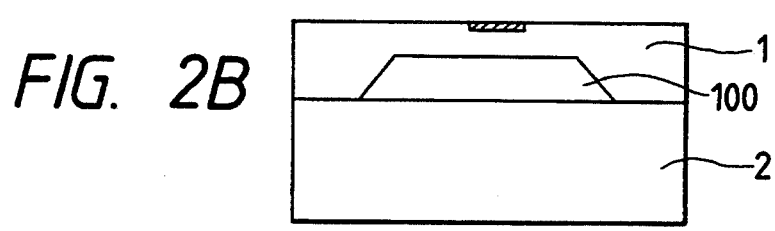
Figure 5A:
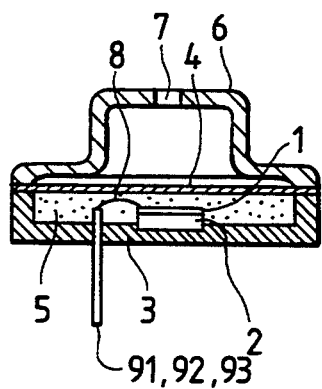
Figure 5B:
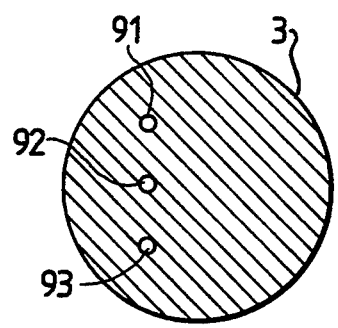

FIGS. 5A and 5B show an embodiment of the absolute-pressure detecting pressure sensor which employs the silicon chip 1 shown in FIG. 1. FIG. 5A is a cross-sectional view, and FIG. 5B is a bottom view, and portions which are common to those of FIG. 2 are denoted by the same reference numerals. As shown in FIG. 1, the silicon chip 1 on which the signal processing circuit is integrated is joined in a vacuum to a pedestal 2 formed of silicon or glass, and a space surrounded by the pedestal and the recessed portion below the diaphragm portion 16 is sealed to form a vacuum. By virtue of this vacuum chamber, this sensor operates as the absolute-pressure detecting sensor. This pedestal 2 is secured on a bottom surface of a container 3. An opening of this container is closed as a sealed diaphragm 4 formed of a metal such as stainless steel is attached thereto by means of welding or adhesion in a state in which the airtightness is maintained. A space surrounded by the sealed diaphragm 4 and the container is filled with an insulating oil 5 such as silicone oil. To protect the sealed diaphragm 4, a container cover 6 is attached thereto in such a manner as to cover the sealed diaphragm 4.

The pressure to be measured is introduced through a hole 7 formed in the cover 6, is applied to the diaphragm portion 16 via the sealed diaphragm 4 and the insulating oil 5, and is converted to an electrical signal corresponding to the absolute pressure. Furthermore, the electrical signal is subjected to amplification, compensation of the temperature characteristic, and adjustment of the characteristic in the signal processing circuit, and is outputted as a sensor output voltage via an aluminum wire 8 using the aluminum pad 23 as well as a lead terminal 93 penetrating the container 3. It should be noted that a lead terminal 91 is for supplying the supply voltage $V_{cc}$ from outside, while a lead terminal 92 is for grounding the sensor circuit.

Next, a description will be given of a method of making adjustment of the characteristic. The adjustment of the circuit is effected by a method of laser trimming or the like in a state in which the silicon chip is exposed before the attachment of the sealed diaphragm 4 and the sealing in of the insulating oil 5. Here, adjustment is made by anticipating in advance an amount of variation of the characteristic due to the sealing in of the insulating oil 5 and the attachment of the sealed diaphragm 4 in subsequent processes. The sensitivity of the sensor with respect to the pressure attenuates due to the resilience of the sealed diaphragm after the attachment of the sealed diaphragm. In addition, in a case where the sealing of the sealed diaphragm is effected by welding, for instance, an offset of a sensor output rises slightly due to the shrinkage of the volume of the space in which the insulating oil 5 is filled during welding. Accordingly, if it is assumed that the characteristic immediately after adjustment is $$V_{out}=aP+b$$

the characteristic after the sealing in of the sealed diaphragm 4 becomes as follows:

$$V_{out}=(a-\delta a)P+b+\delta b$$

Figure 6:
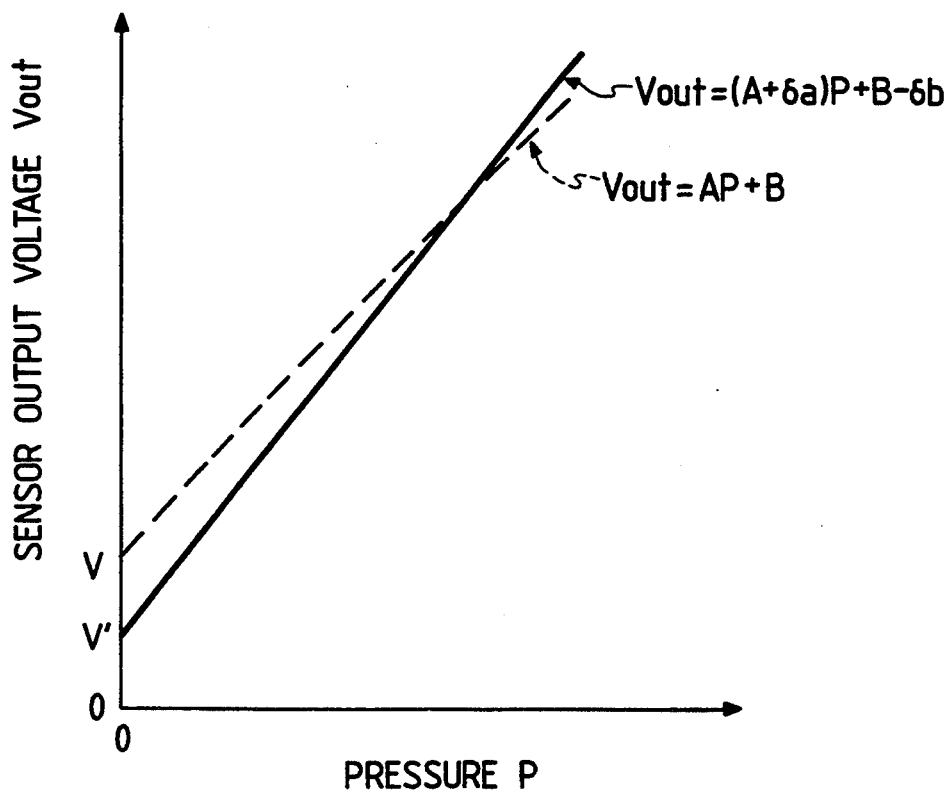
FIG. 6 is a pressure characteristic diagram before and after the sealing in of an insulating oil.

If the thickness of the sealed diaphragm and the shrinkage of the volume during welding are sufficiently uniform, the values of $\delta a$ and $\delta b$ can be regarded as fixed values, respectively. Hence, in a case where a targeted characteristic required of the sensor is the following characteristic expressed by the broken line in FIG. 6:

$$V_{out}=AP+B$$

it suffices if the sensitivity and offset with respect to the pressure are adjusted in such a manner that the characteristic immediately after the adjustment becomes the following characteristic expressed by the solid line in FIG. 6:

$$V_{out}=(A+\delta a)P+b-\delta b$$

In addition, if the insulating oil is sealed in by the sealed diaphragm, there occurs a tendency to increase the sensor output due to a temperature rise because of the influence of the thermal expansion of the insulating oil. However, by providing in advance a negative temperature characteristic corresponding to this positive temperature characteristic in the circuit adjustment, it is possible to offset the influence of the thermal expansion of the insulating oil. As can be seen from the drawings, this sensor is made extremely compact as compared with the sensor shown in FIG. 2.

Figure 4:
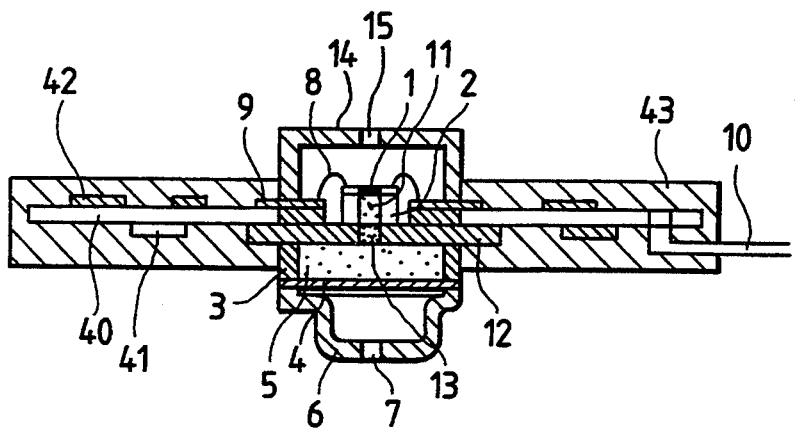
FIG. 4 is a cross-sectional view of a conventional relative-pressure detecting pressure sensor.
Figure 7:
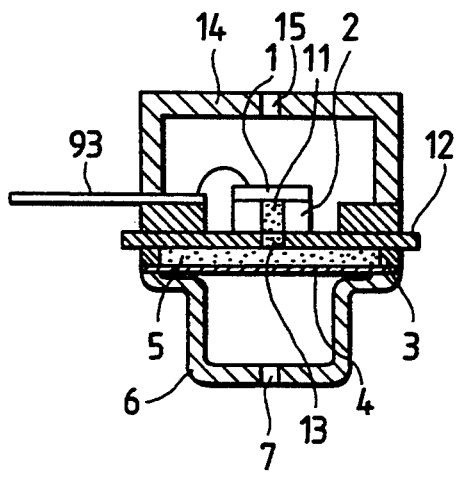
FIG. 7 is a cross-sectional view of a relative-pressure detecting pressure sensor in accordance with another embodiment of the present invention.

FIG. 7 shows an embodiment of the relative-pressure detecting pressure sensor employing the silicon chip 1 in which the signal processing circuit shown in FIG. 1 is integrated in an area other than that for the diaphragm, portions common to those of FIG. 4 being denoted by the same reference numerals. In this sensor, a circuit configuration provided is such that a sensor output normally rises due to the pressurization from a recessed portion-side surface of the diaphragm. The silicon chip 1 is secured on the pedestal 2 where a hole 11 for introducing pressure to a central portion is located. Furthermore, the pedestal 2 is secured on a substrate 12. A hole 13 for introducing the pressure to an extension of the hole 11 in the pedestal 2 is provided in this substrate 12 as well. The insulating oil 5 is sealed in a space surrounded by the sealed diaphragm 4 opposed to the hole 13, the cylindrical container 3, and the substrate 12. The pressure to be measured is introduced through the hole 7 formed in the cover 6, and is transmitted to the recessed portion-side surface of the diaphragm portion 16 of the silicon chip 1 via the insulating oil 5. An unetched surface of the silicon chip 1 is covered with a cover 14, and is open to the atmosphere through a hole 15 formed in the cover. As a result, this sensor operates as a relative pressure sensor. The pressure transmitted to the diaphragm is converted to an electrical signal corresponding to the relative pressure, is subjected to amplification, compensation of the temperature characteristic, and adjustment of the characteristic in the signal processing circuit, and is outputted from the lead terminal 93 as a predetermined sensor output signal. In this case as well, it is possible to obtain a satisfactory pressure characteristic and temperature characteristic by offsetting the effects exerted on the characteristic by the sealed diaphragm and the insulating oil, by using the same method as that for the embodiment shown in FIG. 1. As can be seen from the drawing, this sensor is made extremely compact as compared with that shown in FIG. 4.

Figure 8:
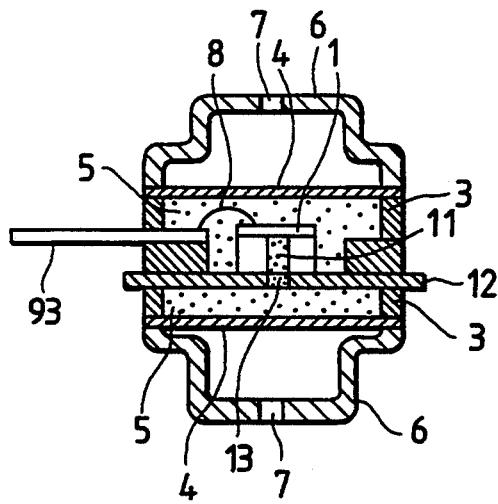
FIG. 8 is a cross-sectional view of a differential-pressure detecting pressure sensor in accordance with still another embodiment of the present invention.

FIG. 8 shows an embodiment of a pressure sensor for detecting the differential pressure of two kinds of pressure by using the silicon chip 1 shown in FIG. 1, portions common to those of FIGS. 5 and 7 being denoted by the same reference numerals. As shown in the drawing, two sealed diaphragms 4 are arranged with the silicon chip placed therebetween. In the same way as in the sensor shown in FIG. 5, a space partitioned by one sealed diaphragm 4 and filled with the insulating oil 5 faces a surface of the diaphragm portion 16 of the silicon chip 1 where the distortion gages 17 are formed, while a space partitioned by the other sealed diaphragm 4 and similarly filled with the insulating oil 5 faces a recessed portion-side of the diaphragm portion 16 in the same way as in the sensor shown in FIG. 7. As a result, it is possible to detect the differential pressure of two kinds of pressure transmitted to the two sealed diaphragms 4 via the insulating oil sealed therein. Here, if the areas and thicknesses of the two sealed diaphragms 4 as well as the volumes of the two spaces filled with the insulating oil 5 are made equal, it is possible to mutually offset the effects of the insulating oil 5 in the two spaces by balancing the same.

As is evident from the above-described embodiments, as all the circuit elements are integrated in and on one semiconductor chip on which a diaphragm is formed, it is possible to omit a circuit board and individual devices which added to an outer side of a container incorporating the semiconductor chip, as well as the resin or the like for protecting them, in the case of conventional arts. As a result, it is possible to reduce the size of the container to a size necessary for incorporating a several-millimeters-square semiconductor chip. In addition, as the terminals penetrating the container are made into three terminals, including a supply terminal, a ground terminal, and an output terminal, which are a necessary minimum, it is possible to obtain a double diaphragm-type semiconductor pressure sensor of a compact size and of a simply assembled structure.

What is claimed is:

1. A semiconductor pressure sensor for detecting a pressure differential, comprising:
   a semiconductor chip having first and second surfaces, the first surface having a recessed portion, the semiconductor chip further having a plurality of distortion gages formed on the recessed portion and constituting a bridge circuit;
   a substrate having first and second surfaces, the substrate having a hole extending from the first surface to the second surface, the first surface of the semiconductor chip being airtightly coupled to the first surface of the substrate to cover the hole in the substrate;
   a first container wall having first and second ends, the first end being airtightly coupled to the periphery of the first surface of the substrate;
   a first sealed diaphragm having its periphery airtightly coupled with the second end of the first container wall and positioned opposite the second surface of the semiconductor chip;
   wherein a first closed space is defined by the second surface of the semiconductor chip, the first surface of the substrate, the first container wall, and the first sealed diaphragm;
   a first liquid filling the first closed space;
   a first container cover having its periphery airtightly coupled to the periphery of the first sealed diaphragm, the first container cover having a hole for communicating a first pressure with the first sealed diaphragm;
   a second container wall having first and second ends, the first end being airtightly coupled to the periphery of the second surface of the substrate;
   a second sealed diaphragm having its periphery airtightly coupled with the second end of the second container wall and positioned opposite the first surface of the semiconductor chip;
   wherein a second closed space is defined by the first surface of the semiconductor chip, the second surface of the substrate, the second container wall, and the second sealed diaphragm;
   a second liquid filling the second closed space; and
   a second container cover having its periphery airtightly coupled to the periphery of the second sealed diaphragm, the second container cover having a hole for communicating a second pressure with the first sealed diaphragm.

2. The semiconductor pressure sensor recited in claim 1, wherein the first and second sealed diaphragms are equal in thickness and area.

3. The semiconductor pressure sensor recited in claim 1, wherein the first and second liquids are of the same composition and the first and second spaces are equal in volume.

* * * * *